April 6, 1965  W. A. WATHEN ETAL  3,176,452
POWER LIFT MECHANISM FOR MOWERS AND THE LIKE
Filed July 13, 1962  2 Sheets-Sheet 1
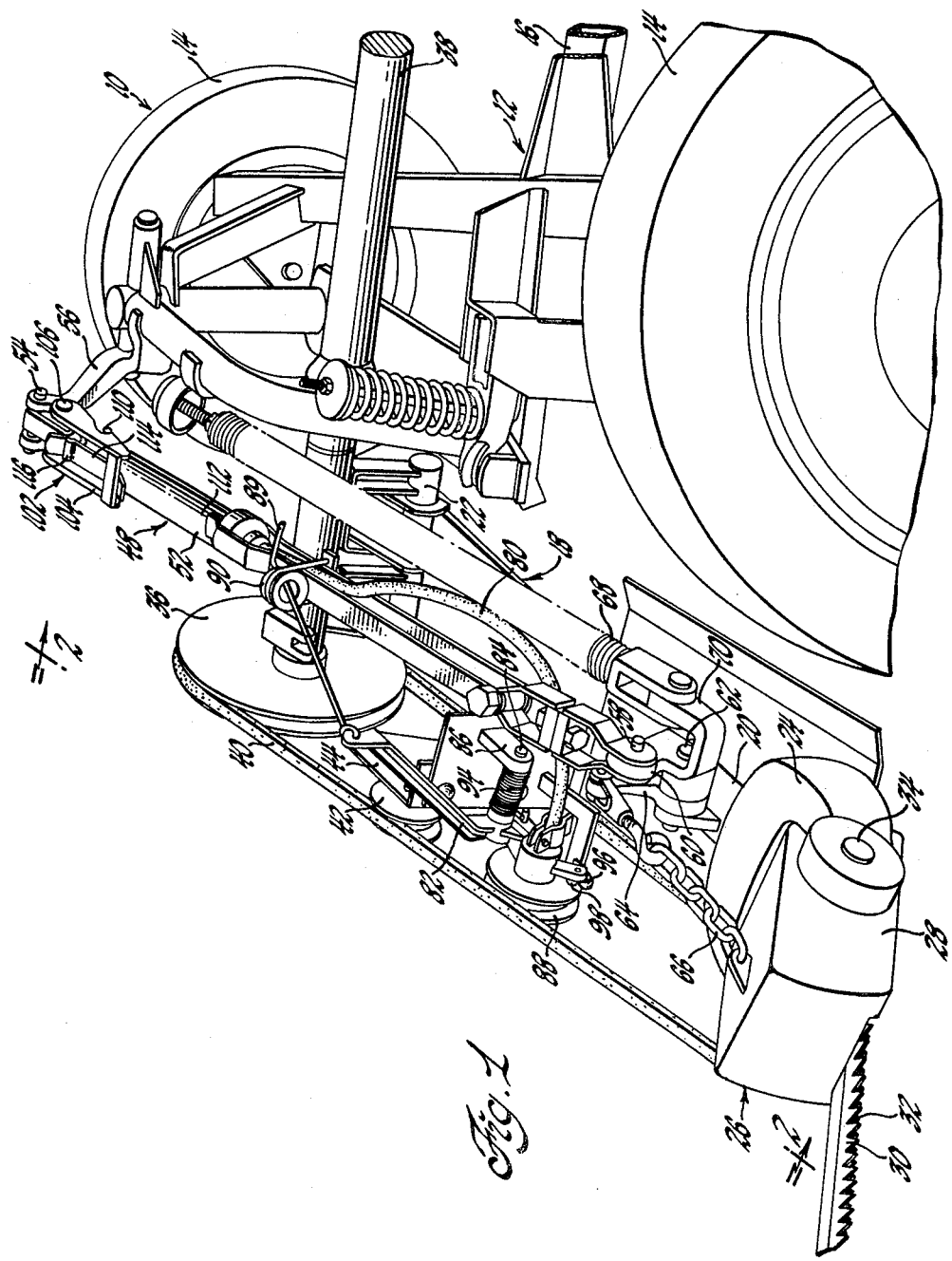
INVENTORS.
WILLIAM A. WATHEN,
MERLE H. PETERSON &
BY  ROBERT G. TURNER
Barnard & McGlynn
ATTORNEYS

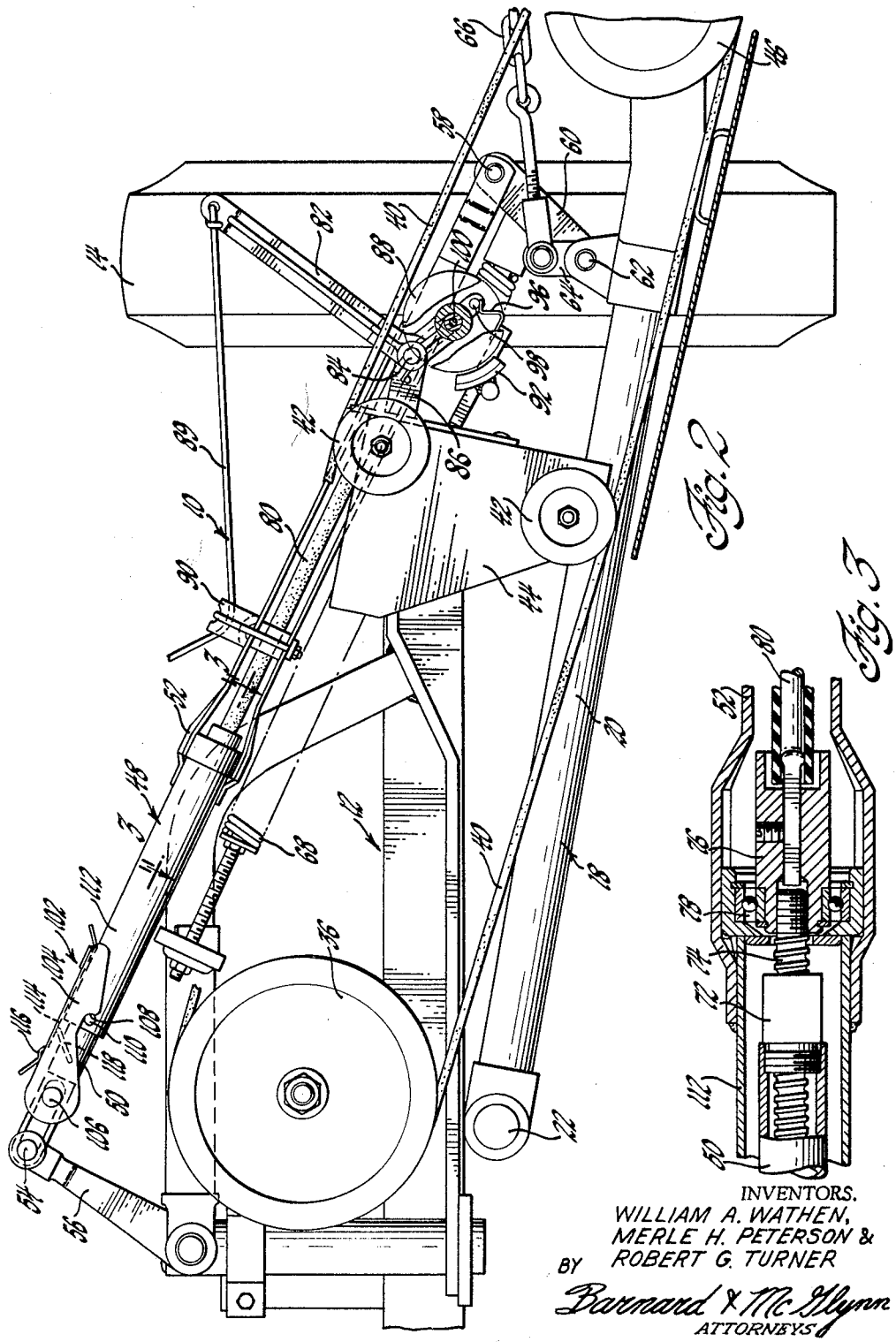

3,176,452
POWER LIFT MECHANISM FOR MOWERS
AND THE LIKE
William A. Wathen, Detroit, and Merle H. Peterson, Livonia, Mich., and Robert G. Turner, Burlington, Vt., assignors to Massey-Ferguson, Inc., Detroit, Mich., a corporation of Maryland
Filed July 13, 1962, Ser. No. 209,512
10 Claims. (Cl. 56—25)

This invention relates to mowers and similar implements of the type comprising wheeled frame means adapted to be pulled behind a tractor and pivotally mounting thereon a mower cutter bar or similar work-performing device for swinging movement between a lowered position and a lifted field transport position and, in particular, relates to a mechanically power actuated mechanism for controlling movement of such a cutter bar or the like between such positions.

Mowers of the type adapted to be pulled or drawn behind a suitable prime mover, such as an agricultural tractor, have been used extensively in past years for mowing grass, weeds and the like. Such mowers typically comprise a mower frame adapted to be suitably coupled to the prime mover through an intermediate draft frame, and a suitable mowing mechanism including a cutter bar and cooperating sickle blade pivotally mounted on the mower frame for swinging movement between a lowered mowing position and a lifted field transport position, as well as being adapted to be further elevated to a road transport position as will be well understood by those acquainted with this art. Various types of mechanism have been provided for controlling the lifting and lowering movement of the cutter bar, and may be generally classified as being of a purely manually operated type, hydraulically power actuated and mechanically power actuated.

Irrespective of the particular type of mechanism employed to control lifting and lowering of the cutter bar, it is highly desirable for obvious reasons that such mechanism will allow the cutter bar in its mowing position to float freely with the mower frame under control of the usual counterbalance spring, while functioning to hold the cutter bar not only in its extreme lifted field transport position but also in any selected position intermediate such field transport position and the free floating mowing position thereof. As will be readily apparent, purely manually operated mechanisms not only require considerable effort merely to raise the cutter bar to the aforementioned field transport position but are somewhat impractical to say the least for the purpose of holding the cutter bar in a position intermediate its mowing position and extreme lifted field transport position. While hydraulically power actuated mechanisms will function to hold the cutter bar in any selected intermediate position, not all prime movers are equipped with a suitable hydraulic system to enable using a mower utilizing such a hydraulically operated mechanism.

Mechanically power actuated mechanisms, on the other hand, have been unable either to positively hold the cutter bar in an intermediate position, particularly without requiring the mower operator's attention, or unable to freely float in the mowing position of the cutter bar without the operator's attention thereto, or both. Furthermore, mechanically power actuated mechanisms heretofore proposed have typically included an auxiliary gear train or similar driving mechanism coupled to and continuously running with the mower drive means or the engine of the prime mover, even though not required to run at any time other than when the cutter bar is to be lifted, thereby wasting power and causing unnecessary wear of various components of such an auxiliary driving mechanism. In addition, it should be noted that mechanically power actuated mechanisms as aforementioned have not been readily interchangeable with the other general types of cutter bar control mechanisms as discussed above, and particularly those of the hydraulically powered variety, which is not too desirable a situation for several reasons. For example, since mowers are typically sold separate from and as an accessory to a prime mover such as a tractor, it is highly desirable that the tractor owner be able to use a mechanically or hydraulically power actuated control mechanism with the mower of his selection according to his desire and the practical consideration of whether or not his prime mover is equipped with a suitable hydraulic system to accommodate a hydraulically actuated control mechanism.

In view of the foregoing considerations, the present invention is directed to an improved mechanically power actuated mechanism for controlling the lifting and lowering movement of a mower cutter bar or the like pivotally mounted on a wheeled frame means for movement between a lowered mowing position and a lifted field transport position, and which mechanism is characterized by an extensible and retractable screw jack including a pair of relatively reciprocable members respectively operatively connected to the frame means and the cutter bar to control movement of the latter between the aforementioned positions, and drive means for the screw jack adapted, first, to be selectively coupled directly to the mower drive mechanism for the sickle blade mounted on the cutter bar for power lift actuation of the screw jack assembly; second, to be selectively engaged with brake means to hold the screw jack substantially stationary and the cutter bar in a corresponding position; and, third, further adapted to be disposed out of engagement with the aforementioned mower drive mechanism and brake means for free floating movement of the screw jack for gravity lowering of the cutter bar and free floating thereof on the frame means as controlled by the usual counterbalance spring. In particular, one aspect of the invention is characterized by the fact that the drive means for the screw jack is adapted to be manually engaged with the mower drive mechanism as aforementioned and, depending upon the rapidity of manual release of the drive means, the latter will be either automatically engaged with the aforementioned brake means or selectively held in its disengaged position, in either case not requiring any further attention by the mower operator.

The invention is further characterized by latch means selectively engageable between the relatively reciprocable members of the screw jack to positively prevent extension thereof and movement of the cutter bar from its extreme lifted field transport position to its mowing position when the cutter bar is being prepared for road transport or relatively long field transport or over extremely rough and irregular terrain in a field. This latch means prevents unnecessary wear on the drive means and cooperating brake means under such circumstances, and is particularly characterized by a latch lever pivotally mounted on one of the members of the screw jack, latch means fixed on the other of the members of the screw jack and engageable with the latch lever to latch the jack against extension thereof, and a latch cocking means operable automatically in response to retraction of the screw jack to a predetermined extent during unlatching thereof to bias the latch lever to a cocked position preventing engagement thereof with the aforementioned latch means during subsequent mowing operations and until the latch lever is uncocked.

The invention is further characterized by the fact that the screw jack of the mechanism is readily interchangeable with a hydraulically power actuated mechanism, and the drive means for the jack readily mountable and demountable on the wheeled frame means of the mower.

In order to facilitate an understanding of the invention, a preferred embodiment thereof will now be described with reference to the accompanying drawings in which:

FIGURE 1 is a fragmentary perspective view of a mowing mechanism with the cutter bar thereof in an extreme lifted field transport position;

FIGURE 2 is an enlarged fragmentary view, partly broken away to illustrate certain details of the invention, taken on line 2—2 of FIGURE 1; and FIGURE 3 is an enlarged fragmentary sectional view taken on line 3—3 of FIGURE 2.

Referring now to the drawings, the numeral 10 generally indicates a wheeled frame means comprising the usual main or draft frame 12 including the ground-engaging transporting wheels 14 mounted thereon and a hitch bar 16 adapted to be connected in the usual manner to a towing prime mover such as an agricultural tractor, and the usual drag or mower frame 18 including the cutter bar support rod 20 having one end thereof suitably journaled to the main or draft frame at 22 for oscillatory movement in a substantially vertical plane, while a yoke 24 is secured to the other end thereof so that the drag or mower frame extends transversely of the rearward portion of the main or draft frame 12. A mowing mechanism indicated generally at 26 is of conventional construction, and includes a sickle blade drive mechanism within the housing 28 mounted on one end of the cutter bar 30 mounting the usual sickle blade 32, the end of the cutter bar adjacent the sickle blade drive housing and the latter being pivotally hinged in the usual manner at 34 between the arms of the yoke 24 so as to permit movement of the cutter bar between a lowered mowing position and a lifted field transport position.

A mower drive mechanism includes a drive pulley 36 suitably rotatably supported on the drag or mower frame 18 and adapted to be connected in the usual manner to a power take off shaft 38 from the prime mover. A drive belt 40 is entrained about the drive pulley 36, a pair of spaced idler pulleys 42 rotatably journaled on a support plate 44 suitably mounted on the drag or mower frame, and a driven pulley 46 coupled in the usual manner to the sickle blade drive mechanism in housing 28 to rapidly reciprocate the sickle blade on the cutter bar for mowing purposes.

A relatively extensible and retractable screw jack assembly 48 comprises a pair of relatively reciprocable members 50 and 52, respectively, one end of the member 50 being suitably pivotally connected at 54 to an arm 56 suitably mounted on the main or draft frame 12 while one end of the other member 52 is suitably pivotally connected at 58 to an arm 60 of a bell crank lever suitably pivotally hinged at 62 on the cutter bar support rod 20 and including another arm 64 connected by the chain 66 to the sickle blade drive housing 28. The usual counterbalance spring 68 is connected between another arm 70 of the bell crank lever and a suitable portion of the main or draft frame 12 in the usual manner. A nut element 72 is suitably rigidly secured to the other end of the jack member 50, while a screw element 74 is threadably received within the nut element and has one end thereof threaded or otherwise secured for rotation with a mounting member 76 rotatably supported as by the bearings 78 within the other jack member 52. A flexible rotatable drive shaft 80 has one end thereof suitably secured within the mounting member 76 to control operation of the screw jack in a manner to be described.

A control lever 82 is pivotally mounted intermediate its ends at 84 on a bracket 86 secured to support plate 44, and mounts a rotatable clutch pulley 88 on one end thereof while the other end is connected through a rope or the like 89 passing through an eye 90 on the screw jack assembly 48 to the operator's position on the prime mover, whereby the operator may control actuation of the control lever. Thus, as the control lever is pivoted, the clutch pulley is adapted to swing between and in the plane of the upper portion of the drive belt 40 and a brake shoe 92 suitably mounted on the support plate 44. A torsion spring means 94 extends about the pivot mounting for the control lever 82, and includes the usual opposite end portions reacting between the bracket 86 and the control lever to continuously urge the latter clockwise in FIGURE 2 toward the brake shoe 92. A yieldable spring clip or detent means 96 has one end suitably secured to the support plate 44, and its other end positioned in the path of movement of a lug 98 carried by the control lever 82 to provide an intermediate free wheeling position for the clutch pulley between a drive position in which the clutch pulley engages the upper portion of the drive belt 40 and a braking position in which the clutch pulley engages the brake shoe 92. The other end of the flexible drive shaft 80 is keyed or otherwise secured as indicated at 100 to the clutch pulley 88 substantially coaxial with its axis of rotation on the control lever 82.

The latch assembly 102 comprises a bifurcated latch arm 104 hingedly connected at 106 to the jack member 50, and including dogging notches 108 cooperable with studs 110 fixed to each side of a tubular portion 112 of the jack member 52. A yieldable spring clip 114 has one end secured to the latch lever and a groove 116 in the other end thereof for cooperation with a bail 118 suitably pivotally mounted on the jack member 50. With the bail seated within the groove 116 on the spring clip 114, the latter biases the latch arm 104 away from the axis of the screw jack assembly to prevent any latching engagement between the dogging notches 108 and the studs 110. With the bail disengaged as illustrated in the drawings, gravity disposes the latch arm along the screw jack assembly whereby retraction of the latter to a predetermined extent will cause the studs 110 to ride past the dogging notches 108, and subsequent extension of the screw jack assembly to dispose the studs in positive engagement with the latch lever to prevent further extension of the assembly. As will be apparent, latching of the assembly in this manner occurs with the cutter bar elevated to its extreme lifted field transport position and positively prevents the cutter bar from falling by gravity from such field transport position.

Referring now to the operation of the aforedescribed construction, it may be assumed that the screw jack assembly 48 is in the latched position shown in the drawings disposing of the cutter bar 30 in its extreme lifted field transport position, and that it is desired to begin a mowing operation. At this time, the bail 118 extends toward the end of the tubular portion 112 of the jack member 52. With the drive belt 40 running, the operator will then pull on the rope 89 to swing the clutch pulley 88 into engagement with the drive belt. At this time, flexible drive shaft 80 rotatably drives screw element 74 to retract the screw jack assembly further from its latched position, resulting in the studs 110 unseating from the latch lever 104 and the end of the tubular portion 112 of jack member 52 engaging and pivoting the bail 118 into engagement with the groove 116 of the spring clip 114. At this time, the latch lever is disengaged and is cocked upwardly by the bail cooperating with the spring clip as, previously described, thereby preventing the latch lever from re-engaging until the bail is manually displaced out of the groove 116 at the end of the mowing operation.

Upon disengagement of the latch as previously described, the mower operator will release the rope 89 slowly preventing the torsion spring means 94 from driving the lug 98 on the control lever past the yieldable detent 96. As a result, the clutch pulley 88 is held in its intermediate free wheeling position and, consequently, the flexible drive shaft 80 is permitted to free wheel and the cutter bar to fall by gravity to its lowered mowing position as the screw jack assembly 48 extends. In the mowing position, of course, the counterbalance spring 68 functions in the usual manner to permit free movement of the cutter bar and floatation thereof over the ground contour.

To lift and positively hold the cutter bar 30 in any selected position between its mowing position and extreme lifted field transport position, the mower operator again pulls on the rope 89 to engage clutch pulley 88 with the drive belt 40 causing drive to be conducted to the screw jack assembly 48 and the latter to retract as previously described to lift the cutter bar. When a selected elevated position of the cutter bar is reached, the operator may rapidly release the rope 89 causing the torsion spring means 94 to drive the lug 98 past the yieldable detent 96 and the clutch pulley 88 to engage the brake shoe 92. As a result, the flexible drive shaft 80 is braked to prevent extension of the screw jack assembly 48 under the weight of the cutter bar. As will be apparent, another pull on the rope will either re-engage the clutch pulley 88 with the drive belt to further lift the cutter bar or will dispose the clutch pulley in its intermediate free wheeling position to permit the cutter bar to be lowered to its mowing position or any other selected position as desired by the mower operator.

When it is desired to relatch the screw jack assembly, the mower operator will manually displace the bail 118 from the groove 116 in the spring clip 114. Thus, the latch lever 104 will fall by gravity into a position in which the dogging notches 108 thereof may engage with the studs 110 upon retraction of the assembly to a predetermined extent corresponding to the field transport position of the cutter bar. The operator then pulls on the rope to engage the clutch pulley with the drive belt and retract the assembly 48 until the latch lever passes over the studs 110, and then releases the rope slowly to permit the cutter bar to float downwardly slightly to extend the assembly until the studs are dogged with the latch lever. When it is desired to return the cutter bar to the mowing position, the mower operator may again pull on the rope to disengage the studs from the latch lever and cock the latter in the manner previously described.

The embodiments of the invention in which an exclusive property or privilege is claimed are defined as follows:

1. In a mower or the like of the type having wheeled frame means, mowing means including a cutter bar pivotally mounted on said frame means for swinging movement between a lowered mowing position and a lifted transport position, and mower drive means mounted on said frame means and drivingly connected to said mowing means; the improvement comprising an extensible and retractable screw jack including a pair of relatively reciprocable members respectively operatively connected to said frame means and said cutter bar to control movement of the latter between said positions, clutch means, drive means connecting said clutch means to said screw jack to control actuation of the latter, brake means mounted on said frame means, manually operable means mounting said clutch means on said frame for movement between a first position in which said clutch means engages said mower drive means to power actuate said screw jack, a second position in which said clutch means engages and is braked by said brake means to hold said screw jack substantially stationary, and a third position in which said clutch means may free-wheel out of engagement with said mower drive means and said brake means, and means operatively associated with said clutch means for selectively holding the latter in said third position thereof upon release of said manually operable means.

2. In a mower or the like of the type having wheeled frame means, mowing means including a cutter bar pivotally mounted on said frame means for swinging movement between a lowered mowing position and a lifted transport position, and mower drive means including a drive belt mounted on said frame means and drivingly connected to said mowing means; the improvement comprising an extensible and retractable screw jack including a pair of relatively reciprocable members respectively operatively connected to said frame means and said cutter bar to control movement of the latter between said positions, manually operable control lever means pivotally mounted on said frame means, a pulley rotatably mounted on said control lever means, drive means connecting said pulley to said screw jack to control actuation of the latter, brake means mounted on said frame means, said control lever means being pivotal between a first position in which said pulley engages said drive belt to power actuate said screw jack, a second position in which said pulley engages and is braked by said brake means to hold said screw jack substantially stationary, and a third position in which said pulley may free-wheel out of engagement with said drive belt and said brake means, and means operatively associated with said control lever means for selectively holding the latter in said third position thereof upon release of said control lever means from said first position thereof.

3. The mower or the like according to claim 1 in which said third position of said clutch means is intermediate said first and second positions thereof, and further comprising yieldable means continuously urging said clutch means away from said first position thereof.

4. The mower or the like according to claim 3 in which said means for selectively holding said clutch means in said third position thereof comprises yieldable detent means operably engageable with said clutch means to hold the latter in said third position thereof, and wherein rapid release of said manually operable means with said clutch means in said first position thereof permits said yieldable means to overcome said yieldable detent means and said clutch means to move to said second position thereof.

5. The mower or the like according to claim 2 in which said third position of said control lever means is intermediate said first and second position thereof, and wherein said means for selectively holding said control lever means in said third position thereof comprises yieldable detent means mounted on said frame means and selectively engageable with said control lever means, and further comprising spring means continuously urging said control lever means away from said first position thereof wherein rapid release of said control lever means from said first position thereof permits said spring means to overcome said yieldable detent means and said control lever means to move to said second position thereof.

6. The mower or the like according to claim 2 in which said screw jack comprises threadably engaged nut and screw elements, one of said elements being fixed to one of said members of said screw jack and the other of said elements being rotatably mounted on the other of said members, said drive means being connected to said rotatable element.

7. The mower or the like according to claim 2 in which said screw jack comprises threadably engaged nut and screw elements, said nut element being fixed to one of said members of said screw jack, said screw element being rotatably mounted on the other of said members, and wherein said drive means comprises a flexible rotatable drive shaft connected to said pulley coaxial with the axis of rotation of the latter on said control lever means and to said screw element.

8. The mower or the like according to claim 2 further comprising latch means selectively engageable between said members of said screw jack to positively prevent extension thereof and movement of said cutter bar from said transport position to said mowing position.

9. The mower or the like according to claim 8 in which said latch means comprises a latch lever pivotally mounted on one of said members of said screw jack, latch means fixed on the other of said members of said screw jack and engageable with said latch lever to prevent extension of said screw jack, a spring clip mounted on said latch lever, and latch cocking means mounted on said one of said members and selectively engageable with said spring clip to bias said latch lever to a cocked position preventing engagement thereof with said latch means.

10. The mower or the like according to claim 9 in which said latch cocking means comprises a bail member pivotally mounted on said one of said members, said other member being engageable with said bail member to pivot the latter into engagement with said spring clip in response to retraction of said screw jack to a predetermined extent.

References Cited by the Examiner

UNITED STATES PATENTS

| | | | |
|---|---|---|---|
| 1,911,387 | 5/33 | Pearson | 56—25 |
| 2,204,333 | 6/40 | Wagner | 56—25 |
| 2,252,379 | 8/41 | Iven | 56—25 |
| 2,277,844 | 3/42 | Clapper | 56—25 |
| 2,288,950 | 7/42 | Johnson et al. | 56—25 |
| 2,496,608 | 2/50 | Thomas | 56—25 |
| 2,523,890 | 9/50 | Vutz | 56—25 |
| 2,826,029 | 3/58 | West | 56—25 |
| 3,043,074 | 7/62 | Christie et al. | 56—25 |

T. GRAHAM CRAVER, *Primary Examiner.*

ALDRICH F. MEDBERY, ARNOLD RUEGG,
*Examiners.*

UNITED STATES PATENT OFFICE
CERTIFICATE OF CORRECTION

Patent No. 3,176,452                      April 6, 1965

William A. Wathen et al.

It is hereby certified that error appears in the above numbered patent requiring correction and that the said Letters Patent should read as corrected below.

Column 8, line 5, for "2,252,379" read -- 2,252,378 --.

Signed and sealed this 24th day of August 1965.

(SEAL)
Attest:

ERNEST W. SWIDER
Attesting Officer

EDWARD J. BRENNER
Commissioner of Patents